United States Patent Office 3,176,034
Patented Mar. 30, 1965

3,176,034
SILOXANE COPOLYMERS OF ALLYL ETHERS
Harold A. Clark, Midland, Mich., assignor to Dow Corning Corporation, Midland, Mich., a corporation of Michigan
No Drawing. Filed Nov. 13, 1961, Ser. No. 152,031
8 Claims. (Cl. 260—448.2)

This invention relates to thermally stable copolymers of polynuclear aromatic ethers and siloxanes. This application is a continuation-in-part of the U.S. application Serial No. 121,830, filed July 5, 1961, now abandoned.

One of the persistent problems in the silicone field has been the relatively poor adhesion between silicone resins and metals. This problem has been particularly bothersome in the production of printed circuits wherein

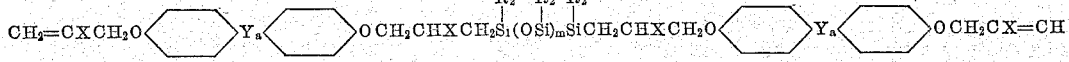

a copper circuit is applied to a silicone resin base. No satisfactory adhesive has been known for securing the copper to the silicone resin. However, because silicone resin based printed circuits are to be operated at elevated temperature, it is necessary that the adhesive have the best possible thermal stability.

It is the object of this invention to provide novel compositions of matter which are useful as adhesives between silicone resins and metals. Another object is to provide polymeric compositions, useful as coatings and as electrical insulation. Other objects and advantages will be apparent from the following description.

The invention relates to copolymers consisting essentially of (1) units of the formula selected from the group

and

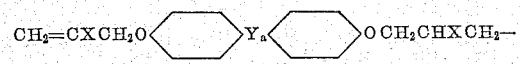

and (2) units of the group

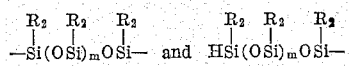

which units are interconnected through SiC bonds, in which copolymer the mol ratio of total units (1) to total units (2) is from 1:2 to 2:1, in said units each X is of the group hydrogen, methyl and halogen, each Y is of the group —C(CH₃)₂—, —CH₂—, —C(CH₃)(C₂H₅), —HC(CH₃)— and O, $a$ has a value from 0 to 1, R is of the group phenyl and methyl radicals, there being at least one phenyl group per two methyl groups and $m$ has a value from 0 to 50 inclusive.

The compositions of this invention are fluid thermoplastic materials, which are best prepared by reacting allyl ethers of the formula

with siloxanes of the formula

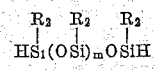

in the presence of a platinum catalyst. Suitable catalysts include platinum-on-charcoal, platinum-on-alumina or compounds of platinum such as chloroplatinic acid. The reaction proceeds smoothly at temperatures from 50° C. to 150° C., although these temperatures are not critical. The reaction proceeds by the addition of the SiH compound to the double bond of the allyl group on the ether to produce linear polymeric material.

The degree of polymerization of the polymer above described, varies with the mol ratio of the respective units. Thus, when one reacts 2 mols of the above allyl ethers with one mol of the above defined siloxanes, one obtains a trimeric polymer of the formula

When one reacts 2 mols of the above siloxanes with 1 mol of the above allyl ethers, the resulting product is a trimeric compound, both ends of which consist of SiH groups. When the mol ratios of the siloxane and the allyl ethers fall between these two limits, higher polymers are obtained. The highest polymers are obtained when one mol of the siloxane is reacted with one mol of the allyl ether. In this case, one end of the polymer will be the group CH₂=CXCH₂O— and the other end of the polymer will be of the group

The thermoplastic products of this invention can be converted into cured thermoset resinous materials by reacting them with polyfunctional siloxanes containing either silicon-bonded vinyl groups or silicon-bonded hydrogen atoms (SiH groups) or combinations of both. The precise polyfunctional siloxane chosen for cross-linking the polymers will depend on the type of end grouping present in the base polymer. Where the end groups in the base polymers are allyl groups, the cross-linker should contain SiH groups. Where the end groups in the base polymer are SiH groups, the cross-linker should contain silicon-bonded vinyl groups. The reaction between the base polymer and the cross-linker is brought about by a platinum catalyst under the same conditions as above described.

It should be understood that the cross-linker can contain both SiH and vinyl groups when the base polymer contains both SiH and allyl endblocking groups.

For best performance, it is preferable that the cross-linker be compatible with the base resin. It is preferable that the cross-linker be a phenyl-containing siloxane.

The allyl ethers employed in this invention are known materials, some of which are described in U.S. Patent No. 2,227,805. The best method for preparing the ethers employed in this invention is shown in said patent and consists of reacting the alkali metal salts of the corresponding diphenyl diols of the formula

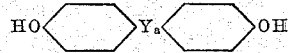

with an allyl chloride of the formula $CH_2=CXCH_2Cl$ in the ratio of 2 mols of allyl chloride per mol of diol.

Specific examples of allyl ethers which are employed herein are 4, 4'-diallyloxy biphenyl; 4, 4-'-diallyloxy diphenyl ether; bis [4-(2-chlorallyloxy)-phenyl]dimethylmethane; bis [4-(2-chlorallyloxy)phenyl]-methylmethane, bis [4-(2-chloroallyloxy)phenyl]methane, bis-[4-(2-chloroallyloxy)phenyl]ethylmethylmethane, and 4-allyloxy, 4'-methallyloxy biphenyl.

The difunctional siloxanes employed to prepare the base polymers of this invention must contain at least one phenyl group for every 2 methyl groups on the silicon atoms. These siloxanes are known materials and can be, for example, such siloxanes as tetraphenyldisiloxane; sym-diphenyldimethyldisiloxane; 1, 1-diphenyl-3, 3-dimethyl-disiloxane; 1,5-diphenyl, 1, 3, 3, 5-tetramethyltrisiloxane; 1, 1, 5, 5-tetramethyl-3, 3-diphenltrisiloxane;

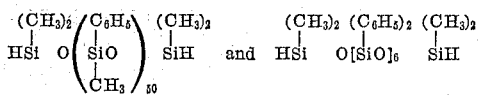 and 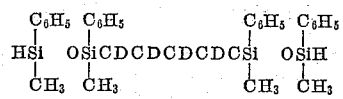

In the commercial utilization of the composition of this invention for the preparation of thermosetting adhesives, one should first react the allyl ethers with the difunctional siloxanes to produce the base polymer. One can then mix the appropriate cross-linking siloxane and the platinum catalyst and heat to cure the mixture to a tough, pliable, cross-linked material. If long shelf life is desired, it is best not to mix the platinum catalyst and/or the cross-linker with the base resin until within a few hours of use. This is true because curing occurs gradually at room temperature. However, it is possible to prolong the shelf life of the completely formulated material by keeping it at temperatures of −20° C. or below.

The following examples are illustrative only and should not be construed as limiting the invention which is properly delineated in the appended claims.

EXAMPLE 1

3.9 parts by weight of sym-diphenyldimethyldi-siloxane was mixed with 2.66 parts by weight of 4, 4'-bis-allyloxy-biphenyl (hereinafter referred to as I) and the mixture was diluted with 5 parts by weight toluene. A trace of a .37 percent by weight platinum in the form of a solution of chloroplatinic acid in butanol was mixed with these ingredients. The mixture was then warmed on a hot plate. A fluid polymer resulted. Letting C represent the unit

and D represent the polymer unit

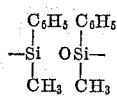

this polymer had the average formula

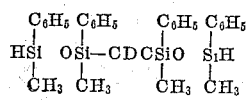

The above fluid polymer was mixed with 1.36 parts by weight of the compound $C_6H_5Si[OSi(CH_3)_2CH=CH_2]_3$. The mixture was warmed at 40° to 50° C. to allow bubbles to escape and then heated at 150° C. overnight. A tough, thermoset, flexible resin which showed excellent adhesion to aluminum and copper was obtained.

EXAMPLE 2

3.9 parts by weight of sym-diphenyldimethyldisiloxane was mixed with 3.33 parts by weight of I and 5 parts by weight toluene. A trace of the platinum catalyst of Example 1 was added and the mixture was heated on a hot plate to give a viscous fluid polymer having the average molecular configuration

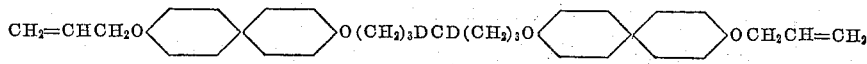

where C and D are as defined in Example 1.

The above base resin was mixed with 1.13 parts by weight of the cross-linker of Example 1 and cured in accordance with the method of this example. The resulting product was a tough, flexible resinous adhesive.

EXAMPLE 3

2.6 parts by weight of sym-diphenyldimethyldisiloxane, 3.99 parts by weight of I and 5 parts by weight toluene were mixed with a trace of the platinum catalyst of Example 1. The mixture was warmed to reflux the solvent and there was obtained a polymeric material having the average formula $$CH_2=CHCH_2O\langle\rangle\langle\rangle O(CH_2)_3DCD(CH_2)_3O\langle\rangle\langle\rangle OCH_2CH=CH_2$$

1.1 part of the cross-linker, $C_6H_5Si[OSi(CH_3)_2H]_3$, was added to this material. The mixture was dissolved in toluene and the solvent was evaporated and the residue was heated at 150° C. to give a flexible, resinous material.

EXAMPLE 4

Employing the procedure of Example 1, 5 parts by weight of $[(CH_3)_2HSiO]_2Si(C_6H_5)_2$, 3.3 parts by weight of I and 5 parts by weight toluene were mxed with the catalyst of Example 1 and reacted to give a fluid polymer of the average formula

In the formula, F represents the group

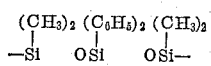

and C is as above defined.

The fluid polymer was mixed with .68 part by weight of the cross-linker of Example 1 and heated at 150° C. to give a tough, flexible cured resin.

EXAMPLE 5

When the following allyl ethers are reacted with the following siloxanes in amount of 2 mols of the ether to one mol of the siloxane in accordance with the procedure of Example 1, the following products are obtained. When each of these products is reacted with an equivalent amount of $CH_3Si[OSi(C_6H_5)(CH_3)H]_3$ in the presence of Pt dispersed on alumina at a temperature of 150° C. a tough, resilient resinous material is obtained.

Table

| | Allyl Ether | Siloxane |
|---|---|---|
| (1) | CH$_2$=C(CH$_3$)CH$_2$O—⬡—⬡—OCH$_2$CCl=CH$_2$ | (CH$_3$)$_2$HSiO(—Si(C$_6$H$_5$)(CH$_3$)O—)$_{50}$Si(CH$_3$)$_2$H |
| (2) | CH$_2$=CBrCH$_2$O—⬡—O—⬡—OCH$_2$CBr=CH$_2$ | (C$_6$H$_5$)$_2$HSi—OSi(C$_6$H$_5$)$_2$H |
| (3) | CH$_2$=CHCH$_2$O—⬡—OC(CH$_3$)$_2$—⬡—OCH$_2$CH=CH$_2$ | (CH$_3$)$_2$HSiO—Si(C$_6$H$_5$)$_2$H |
| (4) | CH$_2$=C(CH$_3$)CH$_2$O—⬡—C(CH$_3$)(C$_2$H$_5$)—⬡—OCH$_2$CCl=CH$_2$ | (CH$_3$)$_2$HSiO—Si(C$_6$H$_5$)$_2$H |
| (5) | CH$_2$=CBrCH$_2$O—⬡—CH$_2$—⬡—OCH$_2$CH=CH$_2$ | (CH$_3$)$_2$HSiO—Si(C$_6$H$_5$)$_2$H |
| (6) | CH$_2$=CClCH$_2$O—⬡—CH(CH$_3$)—⬡—OCH$_2$CCl=CH$_2$ | (CH$_3$)$_2$HSiO(—Si(C$_6$H$_5$)(CH$_3$)O—)$_{40}$Si(CH$_3$)$_2$H |

| | Product |
|---|---|
| (1) | CH$_2$=C(CH$_3$)CH$_2$O—⬡—⬡—OCH$_2$CHClCH$_2$SiO(CH$_3$)$_2$(—Si(C$_6$H$_5$)(CH$_3$)O—)$_{50}$— <br> (CH$_3$)$_2$SiCH$_2$CH(CH$_3$)CH$_2$O—⬡—⬡—OCH$_2$CCl=CH$_2$ |
| (2) | CH$_2$=CBrCH$_2$O—⬡—O—⬡—OCH$_2$CHBrCH$_2$Si(C$_6$H$_5$)$_2$— <br> OSi(C$_6$H$_5$)$_2$CH$_2$CHBrCH$_2$O—⬡—O—⬡—OCH$_2$CBr=CH$_2$ |
| (3) | CH$_2$=CHCH$_2$O—⬡—C(CH$_3$)$_2$—⬡—O(CH$_2$)$_3$SiO(CH$_3$)$_2$Si(C$_6$H$_5$)$_2$— <br> (CH$_2$)$_3$O—⬡—C(CH$_3$)$_2$—⬡—OCH$_2$CH=CH$_2$ |
| (4) | CH$_2$=C(CH$_3$)CH$_2$O—⬡—C(CH$_3$)(C$_2$H$_5$)—⬡—OCH$_2$CHClCH$_2$SiO(CH$_3$)$_2$Si(C$_6$H$_5$)$_2$— <br> CH$_2$CHClCH$_2$O—⬡—C(CH$_3$)(C$_2$H$_5$)—⬡—OCH$_2$C(CH$_3$)=CH$_2$ |
| (5) | CH$_2$=CBrCH$_2$O—⬡—CH$_2$—⬡—OCH$_2$CH$_2$CH$_2$SiO(CH$_3$)$_2$Si(C$_6$H$_5$)$_2$— <br> CH$_2$CH$_2$CH$_2$O—⬡—CH$_2$—⬡—OCH$_2$CBr=CH$_2$ |
| (6) | CH$_2$=CClCH$_2$O—⬡—CH(CH$_3$)—⬡—OCH$_2$CHClCH$_2$SiO(CH$_3$)$_2$(—Si(C$_6$H$_5$)(CH$_3$)O—)— <br> (CH$_3$)$_2$SiCH$_2$CHClCH$_2$O—⬡—C(CH$_3$)(H)—⬡—OCH$_2$CCl=CH$_2$ |

That which is claimed is:

1. A composition of matter consisting essentially of polynuclear aromatic ether-siloxane polymeric fluids selected from the group consisting of (1) 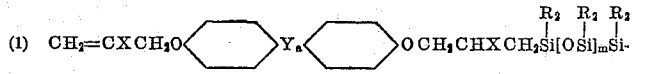

(2) 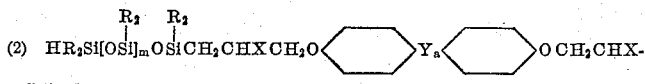

(3) copolymers having (a) at least one -unit, (b) at least one 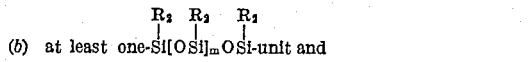-unit and (c) terminal units selected from units of the group consisting of 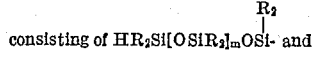 and

wherein the ratio of (a) units to (b) units is between 1/2 and 2/1, each X being selected from the group consisting of hydrogen, methyl and halogen, each Y being a divalent group selected from the group consisting of $-CH_2-$, $(CH_3)\overset{|}{\underset{|}{C}}(C_2H_5)$, $(CH_3)\overset{|}{\underset{|}{C}}H$, $\overset{|}{\underset{|}{C}}(CH_3)_2$ and $-O-$ $a$ has a value from 0–1 inclusive, each R is selected from the group consisting of phenyl and methyl radicals, there being at least one phenyl radical per two methyl radicals and $m$ has a value from 0 to 50 inclusive.

2. A composition of matter as defined in claim 1 further characterized in that $a$ is 0, X is hydrogen and the ratio of methyl to phenyl substituents is 1/1.

3. A fluid polymer of the general formula

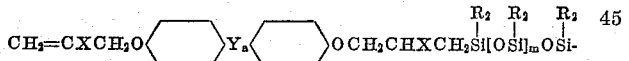
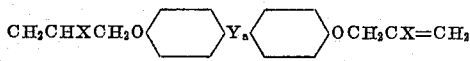

where each X is selected from the group consisting of hydrogen and methyl and halogen, each Y is a divalent radical selected from the group consisting of $\overset{|}{\underset{|}{C}}H_2$, $\overset{|}{\underset{|}{C}}(CH_3)(C_2H_5)$, $\overset{|}{\underset{|}{C}}H(CH_3)$, $\overset{|}{\underset{|}{C}}(CH_3)_2$ and $-O-$ $a$ has a value from 0–1 inclusive, each R is selected from the group consisting of phenyl and methyl radicals, there being at least one phenyl radical per two methyl radicals and $m$ has a value from 0 to 50 inclusive.

4. A fluid polymer of the general formula

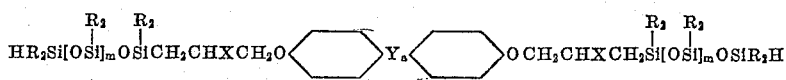

where each R is a monovalent substituent selected from the group consisting of methyl and phenyl radicals, there being at least one phenyl radical per two methyl radicals, each X is a monovalent substituent selected from the group consisting of hydrogen, methyl, and halogen, each Y being a divalent group selected from the group consisting of $\overset{|}{\underset{|}{C}}H_2$, $\overset{|}{\underset{|}{C}}(CH_3)(C_2H_5)$, $\overset{|}{\underset{|}{C}}H(CH_3)$, $\overset{|}{\underset{|}{C}}(CH_3)_2$ and $-O-$ $a$ has a value from 0–1 inclusive and $m$ has a value from 0–50 inclusive.

5. A fluid copolymer of (a) at least one unit of the formula

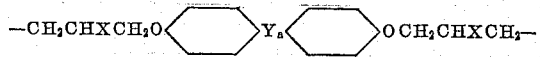

(b) at least one unit of the formula

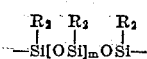

and (c) terminal units selected from the group consisting of units of the formulae

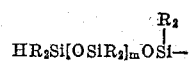

and

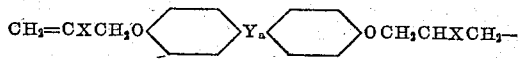

the ratio of (a) units to (b) units being greater than 1/2 and less than 2/1, each X being a monovalent substituent selected from the group consisting of hydrogen, methyl, and halogen, each Y being a divalent group selected from the group consisting of $\overset{|}{\underset{|}{C}}H_2$, $\overset{|}{\underset{|}{C}}(CH_3)(C_2H_5)$, $\overset{|}{\underset{|}{C}}H(CH_3)$, $\overset{|}{\underset{|}{C}}(CH_3)_2$ and $-O-$ $a$ has a value from 0–1 inclusive and $m$ has a value from 0–50 inclusive.

6. A polymer as defined in claim 3 wherein X is hydrogen, $a$ is 0 and the ratio of phenyl to methyl radicals bonded to silicon is 1/1.

7. A polymer as defined in claim 4 wherein X is hydrogen, $a$ is 0 and the ratio of phenyl to methyl radicals bonded to silicon is 1/1.

8. A polymer as defined in claim 5 wherein X is hydrogen, $a$ is 0 and the ratio of phenyl to methyl radicals bonded to silicon is 1/1.

References Cited by the Examiner

UNITED STATES PATENTS 2,637,738  5/53  Wagner _____ 260—46.5
2,915,497  12/59  Clark _____ 260—46.5

FOREIGN PATENTS 599,891  6/60  Canada.
803,129  10/58  Great Britain.

MURRAY TILLMAN, *Primary Examiner.*

J. R. LIBERMAN, WILLIAM H. SHORT, *Examiners.*

UNITED STATES PATENT OFFICE
CERTIFICATE OF CORRECTION tent No. 3,176,034                                 March 30, 1965

Harold A. Clark

It is hereby certified that error appears in the above numbered pat-
requiring correction and that the said Letters Patent should read as
rected below.

Column 2, lines 2 to 4, the formula should appear as shown
low instead of as in the patent:

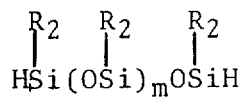

ame column 2, lines 18 to 20, the formula should appear as
hown below instead of as in the patent:

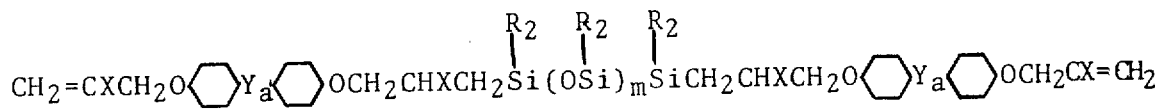

olumn 3, lines 72 to 75, the formula should appear as shown
elow instead of as in the patent:

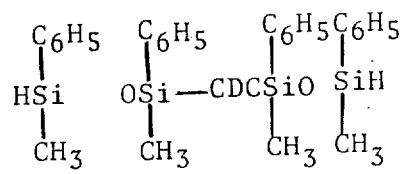

olumns 5 and 6, in the Table, under the column heading "Allyl
ther", formula (3) should appear as shown below instead of as
n the patent:

3,176,034 same columns 5 and 6, same table, under the same heading, formula (4) should appear as shown below instead of as in the patent:

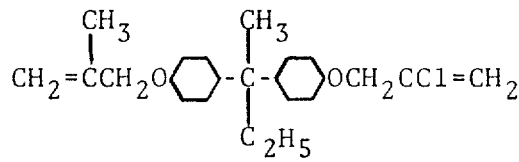

same columns 5 and 6, same table, under the heading "Product" for that portion of the first formula reading

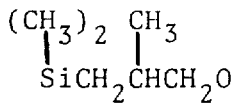   read   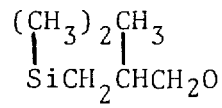

same columns 5 and 6, same table, under the same heading, formula (6), for that portion of the formula reading

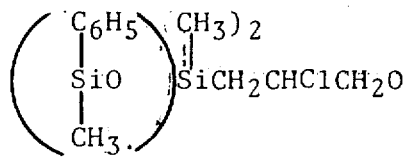   read   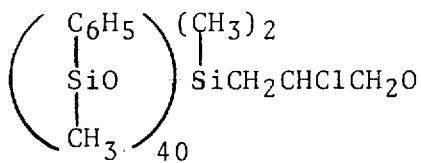

column 7, lines 28 and 29, for that portion of the formula reading

Signed and sealed this 22nd day of February 1966.

(SEAL)
Attest:

ERNEST W. SWIDER
Attesting Officer

EDWARD J. BRENNER
Commissioner of Patents